Dec. 17, 1929.                    W. J. MILLER                    1,739,981
MEANS FOR FEEDING PLASTIC MATERIAL TO MOLDS
Filed Dec. 23, 1926
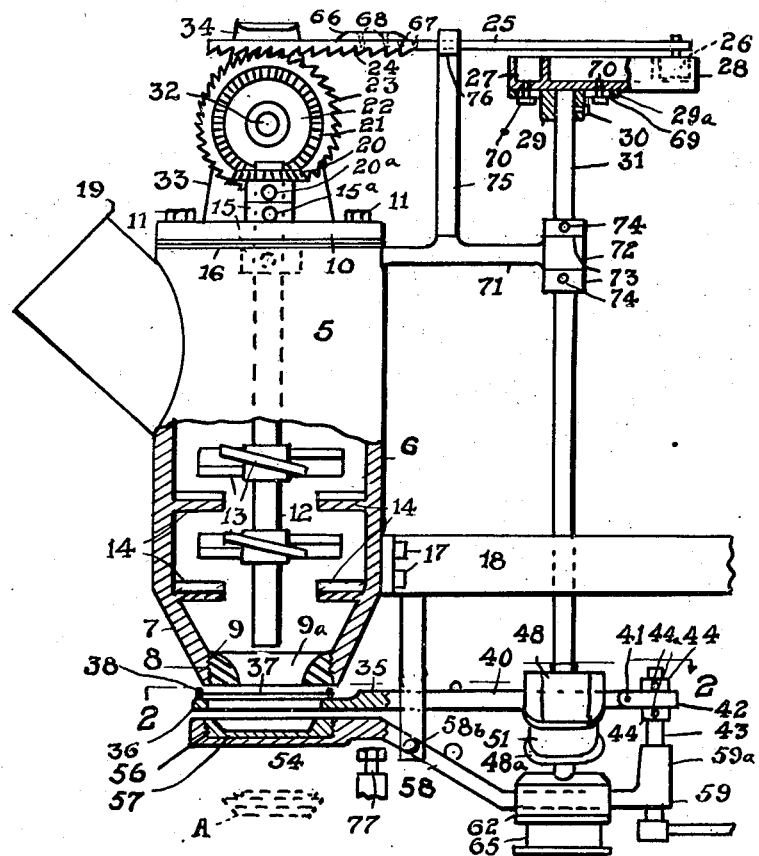
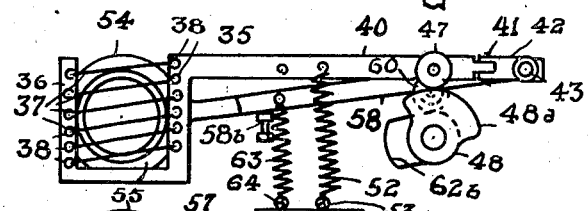
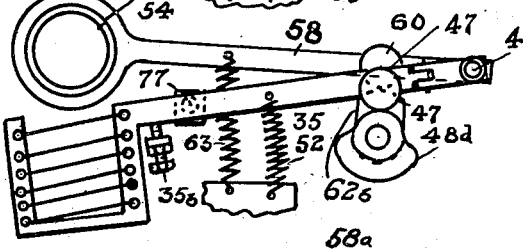
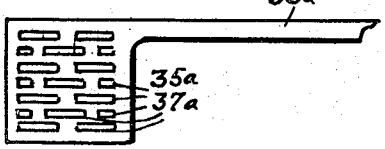
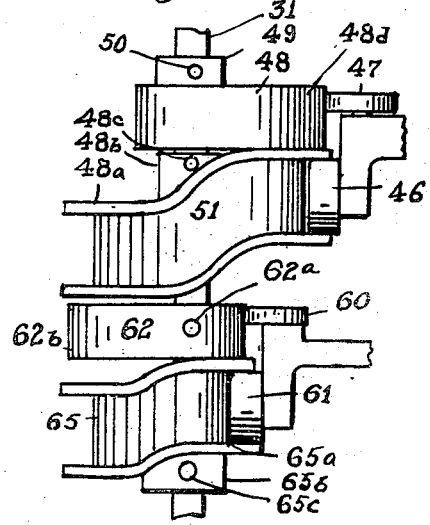
INVENTOR
*William J Miller*
BY
*K. G. Doub.*
ATTORNEY Patented Dec. 17, 1929

1,739,981

UNITED STATES PATENT OFFICE

WILLIAM J. MILLER, OF SWISSVALE, PENNSYLVANIA

MEANS FOR FEEDING PLASTIC MATERIAL TO MOLDS

Application filed December 23, 1926. Serial No. 156,674.

This invention relates to pottery forming machines and more particularly to feeding means therefor.

The present application discloses subject-matter also disclosed in my copending application Serial No. 153,086, filed Dec. 7, 1926, which has become Patent 1,703,316.

In the present instance I construct the severing or segregating means in the form of a grid, through which the charge is extruded onto a former and preformed, the grid then partly severing or completely severing or segregating the charge, depending upon adjustment, and throwing it into or on a mold with sufficient force to cause the charge to spread and adhere to the mold, the former being caused to lower and move laterally to clear the grid member and charge after the latter is preformed.

The principal object of the present invention, therefore, is to provide a simplefied form of mechanism which will automatically extrude a charge of plastic material onto a former, preform the charge, and segregate the charge and deposit it into or on a mold or molds with sufficient force to cause it to spread and adhere to the mold.

Another object of the invention is to provide a combined segregating means and transfer member.

A further object of the invention is to generally simplify the construction of mechanism of this class.

With the foregoing and other objects and advantages in view, the invention consists in the preferred construction and arrangement of the several parts which will be more fully hereinafter described and claimed.

The improved mechanism is adapted to be used with a mold carrier or conveyor of any suitable type which will operate to bring the molds successively in position to receive a charge or batch of the plastic material, or the molds may be placed in position manually, it being immaterial in so far as the present invention is concerned as to the means for disposing the molds in position under and removing them from the feeding mechanism.

The mechanism herein described may also be used in timed relation with a jigger such, for instance, as is disclosed in my copending applications Serial Nos. 143,994, filed Oct. 25, 1926, and 148,872, filed Nov. 17, 1926, or with any other suitable jigger, press or fabricating mechanism.

In the accompanying drawings I have shown the mechanism in preferred form, but it is to be understood that other instrumentalities could be adopted, and particularly with relation to the combined segregating and transfer member, to obtain the results sought without departing from the scope of the invention.

In the drawings:—

Figure 1 is a side elevation, partly in secton and broken away, of a preferred form of mechanism embodying the features of my invention;

Fig. 2 is a section on the line 2—2, Fig. 1;

Fig. 3 is a view similar to Fig. 2, showing the parts moved to another position through the action of the can mechanism;

Fig. 4 is a side elevation of the cams; and

Fig. 5 is a detail plan view of a modified form of severing or segregating and transfer or grid member.

The numeral 5 designates a container for plastic material, preferably of cylindrical form, having side walls 6, which are preferably straight to within a suitable distance of the lower extremity of the container, where they may incline inwardly or converge, as at 7, and form the lower truncated portion of the container. The lower truncated portion of the container is open and provided with screw threads 8, for removable and adjustable application of an orifice member 9 having an opening 9ª. Ths orifice member 9 may be replaced by similar members having varying sized openings and shapes. The upper end of the container has a top or cover 10 suitably secured on the container as by bolts 11, and extending through the top or cover downwardly into the container is a shaft 12, provided with a suitable number of inclined feed blades 13, which cooperate with reversely inclined ribs or blades 14, formed integral with or suitably secured to the inner wall of the container, said ribs 14 acting to retard rotation of the plastic material and assist in the progressive feed of the said material downwardly and extrusion thereof through the orifice opening 9ª. The shaft 12 will preferably be provided with suitable thrust or bearing collars 15, adjustably secured as by set screws 15ª to said shaft above and below the top or cover 10, and the shaft with its inclined feed blades may be adjusted in a vertical direction in the container by means preferably in the form of annular shim washers 16 inserted between the top or cover 10 and upper end of the container 5. The container may be bolted or otherwise secured, as at 17, to a part of the frame 18 of the mechanism. The container also has a chute 19 at one side of the upper extremity thereof, by means of which plastic material may be conveyed to said container.

Adjustably secured as by set screws 20ª on the shaft 12 above the collar 15 is a bevel gear 20, which meshes with bevel teeth 21 formed on one side of a gear 22 near the outer periphery thereof. The gear 22 has inclined teeth 23 on the outer periphery thereof which intermittently mesh with reversely inclined teeth 24 formed on the lower surface of a ratchet bar 25, having suitably secured on one extremity thereof a cam roller 26, moving in a cam track 27 formed in a cam 28 and in turn adjustably secured as by a hub 29 and screw 30 on the upper end of a main drive shaft 31. The gear 22 is suitably secured to a shaft 32, which may extend from other mechanism not shown or be rotatably mounted on a bracket 33 suitably secured to the top or cover 10. Also mounted on the bracket 33 or formed as a part of said bracket is a guide member or bracket 34, through which the ratchet bar 25 slides during reciprocation thereof and which prevents lateral displacement of said bar 25 at this point. The cam 28 is shown to illustrate one preferred form of imparting reciprocatory movement to the ratchet bar 25, to in turn impart an intermittent rotation to the shaft 12, and it will be obvious that other means could be employed for this purpose and accomplish the same result.

One of the most essential features of improvement in the present invention resides in the provision of a combined segregating or severing means and transfer or grid member, one preferred form of which is shown in plan view in Figs. 2 and 3 and generally designated by the reference character 35. This combined severing and transfer or grid member 35 preferably has one extremity thereof formed as a yoke 36 across which are strung a suitable number of cutting wires or the like, as at 37, and removably secured in opposite sides of the yoke as at 38. These wires or cutting members extending across the bracket or yoke form a grid, and a sufficient number of said members will preferably be used to provide for efficient functioning of the device. This grid member 35 is preferably disposed horizontally at the lower part of the mechanism and has the yoke extremity thereof directly under the orifice opening 9ª when in normal position and the opposite or handle extremity 40 extending across and hinged or pivoted as by a pin 41 extending through the bifurcated inner portion of a bracket 42, loosely and rotatably mounted on a guide rod 43, which may form a part of the stationary frame of the machine. The bracket or yoke 42 is preferably retained in position vertically by collars 44, adjustably mounted as by screws 44ª on the rod 43 above and below said bracket or yoke. At a suitable distance along its length near the pivot or hinge 41 the handle extremity 40 preferably has mounted thereon cam rollers 46 and 47, the cam 47 engaging a cam 48 adjustably mounted on the shaft 31 as by a hub 49 and screw 50, as shown in Fig. 4. The lower roller 46 is mounted vertically and is guided in a cam track 51 formed in a cam 48ª, the upper roller 47 being preferably mounted at right angles to the lower roller and continually engaging the surface of the cam 48. The cam 48ª is adjustably mounted on the shaft 31 preferably by a hub 48ᵇ and screw 48ᶜ.

By referring to Figs. 2, 3 and 4 it will be seen that the cams 48 and 48ª impart three distinct, timed movements to the grid member 35, viz: to first move said grid member laterally a sufficient distance, depending upon adjustments, to either partly sever or segregate the charge, which would be part of the distance between two of the wires or cutters, or completely sever the charge, which would be the full distance between two of the wires or cutters, second, to drop the grid member and expel the charge, and third, to raise the grid member and shift it horizontally back to normal position.

The first or cutting movement will be caused by the roller 47 moving off the raise 48ᵈ, Fig. 2, formed on the cam 48, at which time the roller will be caused to follow the cam contour through tension of a spring 52, connected at one extremity to the handle extremity 40 of the grid member and at its opposite extremity adjustably secured as by a screw bolt 53 with a hook head and screwed in a part of the frame of the mechanism. The second or drop movement of the grid member 35 will be caused by the cam roller 46 moving down the sharp incline in the track 51. The third movement or return to normal position of the grid member 35 will be caused by the cam roller 46 moving up the incline in the track 51 and the cam roller 47 encountering the raise 48ᵈ.

Mounted horizontally below the combined severing and transfer or grid member 35 is a former-carrying member generally designated by the reference character 54, preferably having an enlarged disk-shaped head or extremity 55 with a threaded recess 56 in the upper surface thereof, for adjustable and removable securement of a former 57 therein. In the present instance the former is adjusted as to height relatively to the severing or grid member 35 and also relatively to the orifice opening 9a through threads formed on its outer portion engaging the threads in the recess 57, but it will be understood that other means may be adopted to secure such adjustment.

The former-carrying member 54 preferably has a downwardly inclined handle portion 58 formed with a horizontal extremity 59, having cam rollers 60 and 61 mounted thereon and disposed at right angles to each other, as shown in Fig. 4. The roller 60 engages a cam 62, also adjustably mounted on the vertical shaft 31 as by a set screw 62a, said cam 62 having a raise or high part 62b, the said roller 60 being maintained in engagement with the surface or contour of the cam 62 preferably by means of a coil spring 63, attached at one extremity to the handle portion 58 of the former-carrying member 54 and at its opposite extremity adjustably secured as by a screw bolt 64 to a part of the frame of the machine. The lower roller 61 moves in a cam track 65 formed on a cam 65a, also adjustably mounted on the shaft 31 as by a hub 65b and screw 65c, this track imparting the vertical movements to the former-carrying member. The cams 62 and 65a with the cam track 65 and raise or high part 62b are shaped or formed so as to first move the former-carrying member downwardly and then laterally and then upwardly and laterally back to normal position or directly under the opening 9a of the orifice member 9, the tension of the spring 63 serving to keep the cam roller 60 in engagement with the surface or contour of the cam 62 and thereby returning the former-holder to its lateral position while the cam roller 61 following in the track 65 serves to lower and raise said member, as above specified.

It will thus be seen that the grid member 35 and former-carrying member 54 both move laterally a sufficient distance to clear each other and that both members also have vertical movements imparted thereto, but these movements are in contradistinction, or the former-carrying member first moves downwardly and then laterally, while the grid member first moves laterally in a direction preferably opposite to the lateral movement of the former-carrying member, then drops, and then raises vertically and laterally back to normal position under the opening 9a of the orifice member 9. These movements are timed, and, as hereinbefore noted, the cams 48 and 48a and 62 and 65a are adjustable on the shaft 31, which enables the movements to be timed as desired. The one extremity 59 of the former-carrying member is preferably formed with an annular guiding projection, as at 59a, a bore being formed vertically through this projection and handle extremity, so that the said member may be rotatably mounted and have a loose sliding fit on the guide rod 43 and not bind or stick on the latter.

It is usually desirable to impart a slight reverse movement to the feed blades 13 at approximately the end of their feeding stroke, so as to retract or raise the plastic material in the container 5 and from the orifice opening 9a. Various means could be utilized to accomplish this result, but in the present instance I prefer to adjustably mount a block 66, beveled or inclined at opposite extremities, on the upper longitudinal surface of the ratchet bar 25, which has a number of screw holes 67 formed therein. A screw or screws 68 may then be passed through the block into any one or more of these screw holes 67, and the block adjusted as desired. At approximately the end of the feeding stroke of the ratchet bar or the beginning of its return stroke, the block will contact with the bracket 34 and prevent the oppositely inclined teeth 24 and 23 of the bar 25 and gear 22 from unmeshing for the length of the block, and at which time the blades will have a slight reverse movement imparted thereto, and thereby raise or retract the plastic material in the container 5 and from the orifice opening 9a.

For adjusting the stroke of the ratchet bar 25 and varying the size of the charge or gob extruded, I prefer to form the hub 29 with a flange 29a having slots 69 through which suitable screw bolts 70 may extend into screw holes formed in the bottom of the cam disk 28. By loosening the screw bolts 70, the cam 28 may be adjusted to obtain the desired stroke, after which the said bolts may be tightened to hold the cam in stable position. It is obvious that other means could be adopted to secure this desired adjustment.

To steady the grid member 35 and former-carrying member 58 and ensure proper vertical alinement upon their return to normal position, I prefer to provide adjustable stops 35b and 58b, which may be screwed or otherwise adjustably attached to the frame of the mechanism.

It is obvious that various forms of grid members could be utilized and serve in a practical manner to sever or segregate the charge and transfer it to a mold. Fig. 5 shows a modified construction of grid member 35a, which may be stamped from suitable sheet metal. In this instance it is preferred to form the grid member with a number of approximately rectangular openings 37a in staggered relation and of varying sizes, or the grid could be formed somewhat similar to a sieve, or so that when the plastic material is extruded therethrough and the grid moved laterally a sufficient distance to sever the charge, for instance, some of the plastic material of the charge will ooze through or between the openings and cause the charge to adhere to the grid. The handle extremity 58ª of this modified form of combined severing or segregating and transfer member may be the same as that previously described and connected and actuated in the same manner.

The drive shaft 31 is held stable by a support 71, suitably attached to the upper part of the container and having the outer extremity thereof, as at 72, formed with a vertical bearing opening through which the drive shaft rotatably extends, adjustable bearing collars 73 being preferably secured to the drive shaft as by screws 74 above and below said bearing opening. The support 71 also has suitably secured thereto a vertical guide bracket 75 with an upper bifurcated extremity, as at 76, to guide the ratchet bar 25 during reciprocation thereof and prevent lateral movement or play.

The grid member 35 may be adjusted and timed to perform its transferring and throwing function in a number of different ways and at such times as will prove the most efficient and desirable. For instance, the said member may be adjusted and timed to move laterally and partly sever the charge, then drop and tear off the charge and throw, or, move laterally and completely sever the charge and throw, or, the cam 48 may be formed so as to cause the grid member to cut completely across and the track 65 in the cam 65ª then causing said member to depress into the charge before the former member is removed and then throw. In the first instance the plastic material in the container may be retracted or lifted while the charge is being partly severed and thus assist in segregating the charge. In the second instance the block 66 may be removed and retraction of the material dispensed with and the charge caused to adhere to the grid member through re-adhesion of the severed portions. In the third instance the plastic material may be retracted during severance. In any event, the plastic material may be retracted at any time desired or found necessary to the efficient functioning of the grid member 35, or immediately prior to severance, during severance or immediately after severance.

From the foregoing the operation of the improved feeder mechanism should be readily understood. It will be seen that the grid member 35 or 35ª performs the functions of severing or segregating the charge and transferring it to the mold, indicated at A. When the drive shaft 31 is actuated, the shaft 12 carrying the feed blades 13 will have a predetermined feeding rotation imparted thereto through the connections heretofore described, to thereby extrude a predetermined charge or batch of plastic material through the orifice opening 9ª and also through the grid member or combined severing and transfer member 35 or 35ª forcefully against or onto a former adjustably threaded in the recess 56 of the former-holder 54 and partly preform the charge or this action may in some instances be considered sufficient to completely preform the charge. It is desirable that the former be of such material and treated so that the plastic charge will not adhere thereto. The cam 48 may be so adjusted on the shaft 31 or timed that the raised part 48ᵈ thereof will cause the grid member to move laterally and partly or completely sever the charge immediately after extrusion and during retraction, or during extrusion, or prior to retraction, depending upon adjustment, and this lateral or cutting movement may be the full distance between the wires 37 or only the partial distance between said wires or members, as heretofore explained. The charge may be caused to adhere to the grid by some of the plastic material oozing between the wires and binding on the upper surface of the grid after the charge is severed, or the charge may be partially severed and remain adhering to the plastic material in the orifice opening 9ª and torn off and thrown, as also heretofore explained. The cams 62 and 65ª may be adjusted or timed on the shaft 31 so that at approximately the time the charge is extruded onto the former and severed or partially severed, the cam track 65 on the cam 65ª and contour of the cam 62 will cause the former-holder 54 with its former to drop or lower and move laterally, leaving the charge adhering to the grid member 35 or partially cut and adhering to the plastic material in the orifice opening 9ª ready to be torn off and thrown. The cam roller 46 moving in the track 51 will then cause the grid member to drop, bearing the completely severed and adhering charge or partially severed and torn charge, and impact against an adjustable stop member 77, which may be threaded in a part of the stationary frame of the machine, and deposit the charge into or on the mold A with sufficient force to cause it to spread and adhere thereto, after which the rollers 46 and 47, moving up over the track 51 and against the high part 48ᵈ, will return the grid member to normal position. The former-holder will then be returned to normal position through the rollers 61 and 60 moving in the track 65 and against the high part 62ᵇ of the cam 62.

It is obvious that any number of the improved feeders could be employed in parallel or in series or in parallel and series, to feed any number of molds simultaneously or approximately simultaneously by merely extending the frame and such operating parts as are necessary to accommodate the additional units.

What is claimed as new is:

1. In mechanism of the class specified, means for extruding onto a former, and unitary means for segregating the material in charges and depositing the charges into or on suitable molds.

2. In mechanism of the class specified, means for extruding charges of plastic material, and unitary means for segregating and transferring the charges.

3. In mechanism of the class specified, a former, means for extruding a predetermined charge of plastic material onto the former, and a combined segregating and transferring member for depositing the charge into or on a mold.

4. In mechanism of the class specified, a former, means for extruding plastic material forcefully against the former, grid means through which the material is extruded, and means for operating the grid means to segregate the material in charges.

5. In mechanism of the class specified, means for extruding plastic material onto a former, means for movably and adjustably supporting the former, and means for segregating the material in charges and transferring the latter from the former to suitable molds.

6. In mechanism of the class specified, means for extruding predetermined charges of plastic material onto a former, a vertically and laterally movable former-carrying member, and grid means for segregating the charges and transferring the latter to suitable molds.

7. In mechanism of the class specified, means for extruding predetermined charges of plastic material onto a former, a vertically and laterally movable former-carrying member, a laterally and vertically movable segregating and transferring member, and cam devices for operating said members.

8. In mechanism of the class specified, means for extruding plastic material, means for severing the material in charges and through which the material is extruded, means for retracting the plastic material, and adjustable cam devices for operating the severing means to move in a lateral plane either prior to retraction, during retraction or after retraction of the plastic material.

9. In mechanism of the class specified, a former, means for extruding plastic material forcefully against the former, grid means through which the plastic material is extruded, and means for operating the grid means to segregate the material into charges and deposit the charges into or on suitable molds.

10. In mechanism of the class specified, a former, means for extruding predetermined charges of plastic material forcefully against the former, an adjustable former-carrying member, an adjustable combined segregating and transferring member, and means for operating said members in timed relation to receive a charge of plastic material, segregate the charge and transfer it to a mold.

11. In mechanism of the class specified, a former, means for extruding predetermined charges of plastic material forcefully against the former and preforming the charges, a former-carrying member, a combined severing and transferring member, and adjustable means for operating said members in timed relation to one another and the extruding means to segregate the charges and transfer the charges to suitable molds.

12. In automatic feeder mechanism for pottery forming machines, a combined segregating and transfer member having a yoke extremity formed as a grid, a former-carrying member cooperating with said segregating and transfer member, and adjustable cam devices for operating both members in timed relation to preform, segregate and transfer charges of plastic material.

13. In automatic feeder mechanism for pottery forming machines, a combined segregating and transfer member, a former, a former-carrying member cooperating with said segregating and transfer member, means for extruding a predetermined charge of plastic material forcefully against the former, and means for imparting vertical and lateral movements to said members in timed relation to the extruding means.

14. In mechanism of the class specified, a container for plastic material having an outlet orifice, a combined severing and transfer member comprising a yoke extremity in the form of a grid, and means for actuating said member adjacent said orifice.

15. The method of feeding plastic material to molds in the manufacture of pottery, which consists in extruding a charge through a segregating means and utilizing said segregating means as a transferring means through the adhesive characteristics of said material.

16. The method of feeding plastic material to molds in the manufacture of pottery, which consists in extruding a charge of material through a combined segregating and transferring means and transferring said charge to a mold through the inherent plasticity of the material.

17. The method of feeding plastic material to molds in the manufacture of pottery, which consists in extruding a predetermined charge of material through a combined segregating and transferring means onto a former, and transferring the charge from the former to a mold through the adhesive properties of said material.

18. The method of feeding plastic material to molds in the manufacture of pottery, which consists in extruding a predetermined charge of material through a severing means, onto a former, and utilizing the severing means as a transferring member through the plastic and adhesive properties inherent to said material.

19. The method of feeding plastic material to molds in the manufacture of pottery, which consists in extruding a predetermined charge of material through a grid member onto a former and utilizing the grid member to segregate and preform the charge, and transferring the charge to a mold by the grid member through the plastic and adhesive properties inherent to said material.

Signed by me this 22nd day of December, 1926.

WILLIAM J. MILLER.